United States Patent
Vaskevich et al.

(10) Patent No.: US 8,266,414 B2
(45) Date of Patent: Sep. 11, 2012

(54) METHOD FOR EXECUTING AN INSTRUCTION LOOP AND A DEVICE HAVING INSTRUCTION LOOP EXECUTION CAPABILITIES

(75) Inventors: Lev Vaskevich, Rehovat (IL); Itzhak Barak, Kadima (IL); Amir Paran, Arugot (IL); Yuval Peled, Givatayim (IL); Idan Rozenberg, Ra'Anana (IL); Doron Schupper, Rehovot (IL)

(73) Assignee: Freescale Semiconductor, Inc., Austin, TX (US)

( * ) Notice: Subject to any disclaimer, the term of this patent is extended or adjusted under 35 U.S.C. 154(b) by 336 days.

(21) Appl. No.: 12/194,286

(22) Filed: Aug. 19, 2008

(65) Prior Publication Data

US 2010/0049958 A1    Feb. 25, 2010

(51) Int. Cl.
*G06F 9/40* (2006.01)

(52) U.S. Cl. .............................. 712/241; 712/233

(58) Field of Classification Search ................ None
See application file for complete search history.

(56) References Cited

U.S. PATENT DOCUMENTS

| | | | |
|---|---|---|---|
| 6,003,128 A * | 12/1999 | Tran ................................ 712/241 |
| 6,058,473 A | 5/2000 | Guttag et al. |
| 6,269,440 B1 * | 7/2001 | Fernando et al. ............. 712/241 |
| 6,507,921 B1 | 1/2003 | Buser et al. |
| 6,598,155 B1 * | 7/2003 | Ganapathy et al. ........... 712/241 |
| 6,671,799 B1 | 12/2003 | Parthasarathy |
| 6,766,444 B1 | 7/2004 | Singh et al. |
| 6,898,693 B1 | 5/2005 | Singh et al. |
| 6,950,929 B2 * | 9/2005 | Chung et al. .................. 712/241 |
| 7,065,636 B2 | 6/2006 | Inoue et al. |
| 7,136,989 B2 * | 11/2006 | Ishii ................................ 712/23 |
| 7,366,885 B1 * | 4/2008 | Radhakrishnan et al. .... 712/241 |
| 2002/0078326 A1 | 6/2002 | Roth et al. |
| 2002/0078333 A1 | 6/2002 | Inoue et al. |
| 2002/0087853 A1 | 7/2002 | Singh et al. |
| 2002/0138718 A1 | 9/2002 | Schlansker et al. |
| 2004/0024998 A1 | 2/2004 | Chauvel |
| 2004/0193858 A1 * | 9/2004 | Ahmad et al. ................ 712/241 |
| 2005/0188188 A1 | 8/2005 | Mayer |
| 2006/0182135 A1 * | 8/2006 | Pisek ............................ 370/406 |
| 2006/0242394 A1 * | 10/2006 | Uchiyama .................... 712/241 |
| 2007/0113057 A1 * | 5/2007 | Knoth ........................... 712/241 |

* cited by examiner

*Primary Examiner* — Eric Coleman

(57) ABSTRACT

A method for managing a hardware instruction loop, the method includes: (i) detecting, by a branch prediction unit, an instruction loop; wherein a size of the instruction loop exceeds a size of a storage space allocated in a fetch unit for storing fetched instructions; (ii) requesting from the fetch unit to fetch instructions of the instruction loop that follow the first instructions of the instruction loop; and (iii) selecting, during iterations of the instruction loop, whether to provide to a dispatch unit one of the first instructions of the instruction loop or another instruction that is fetched by the fetch unit; wherein the first instructions of the instruction loop are stored at the dispatch unit.

20 Claims, 4 Drawing Sheets

METHOD FOR EXECUTING AN INSTRUCTION LOOP AND A DEVICE HAVING INSTRUCTION LOOP EXECUTION CAPABILITIES

FIELD OF THE INVENTION

The present invention relates to a method for executing an instruction loops and a device having instruction loop execution capabilities.

BACKGROUND OF THE INVENTION

Modern processors are required to execute multiple instructions within a very short period of time. Some processors increase their throughput by executing multiple instructions in parallel. These parallel-processed instructions are arranged in variable length groups of instructions that are also known as Very Long Instruction Words (VLIW).

Multiple VLIWs can form an instruction loop that should be repetitively executed. The instruction loop is usually detected by comparing a current program counter value to a start address of the instruction loop and, additionally or alternatively, to an end address of the instruction loop.

A typical pipelined processor includes multiple pipeline stages such as a fetch unit, a dispatch unit, a decode unit, an execution unit and the like. The fetch unit fetches instructions from a memory unit via an instruction bus. The fetch unit has a certain memory space for storing instructions. This memory space has a limited size due to cost and semiconductor area constrains.

The size of an instruction loop can exceed the size of the memory space allocated for storing instructions in the fetch unit. An instruction loop that can not be entirely stored in the fetch unit is referred to as a long instruction loop. When such a long instruction loop is executed there is a need to stall the pipeline stages due to starvation as the pipelined stages can process more instructions than they are being fed, or because of the change of flow associated with the fetching and executing the first instruction (start address) in the loop immediately after the last instruction.

The size of a VLIW can exceed the width of the instruction bus. In this case the retrieval of a VLIW instruction from the memory unit (to the fetch unit) can be slower than the rate of providing the VLIWs to the dispatch unit. For example, if the VLIW can be up to 144 bits long and the instruction bus is 128 bit wide then the difference between a fetch rate of 128 bits per cycle and a retrieval rate of 144 bit per cycle can empty the fetch unit. The mentioned above cycle can be the execution cycle of a pipeline stage.

If, for example, the start address of the first VLIW of an instruction loop is a cross boundary between two fetch sets (a fixed size chunk of data from the memory unit to the fetch unit) than the first VLIW will be fetched during two cycles, causing a stall.

Imposing limitations on the length of the instruction loop (for example, limiting it to instructions that can be fetched during only two fetch cycles) is not practical.

SUMMARY OF THE PRESENT INVENTION

The present invention provides a method and a system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Figure 1:
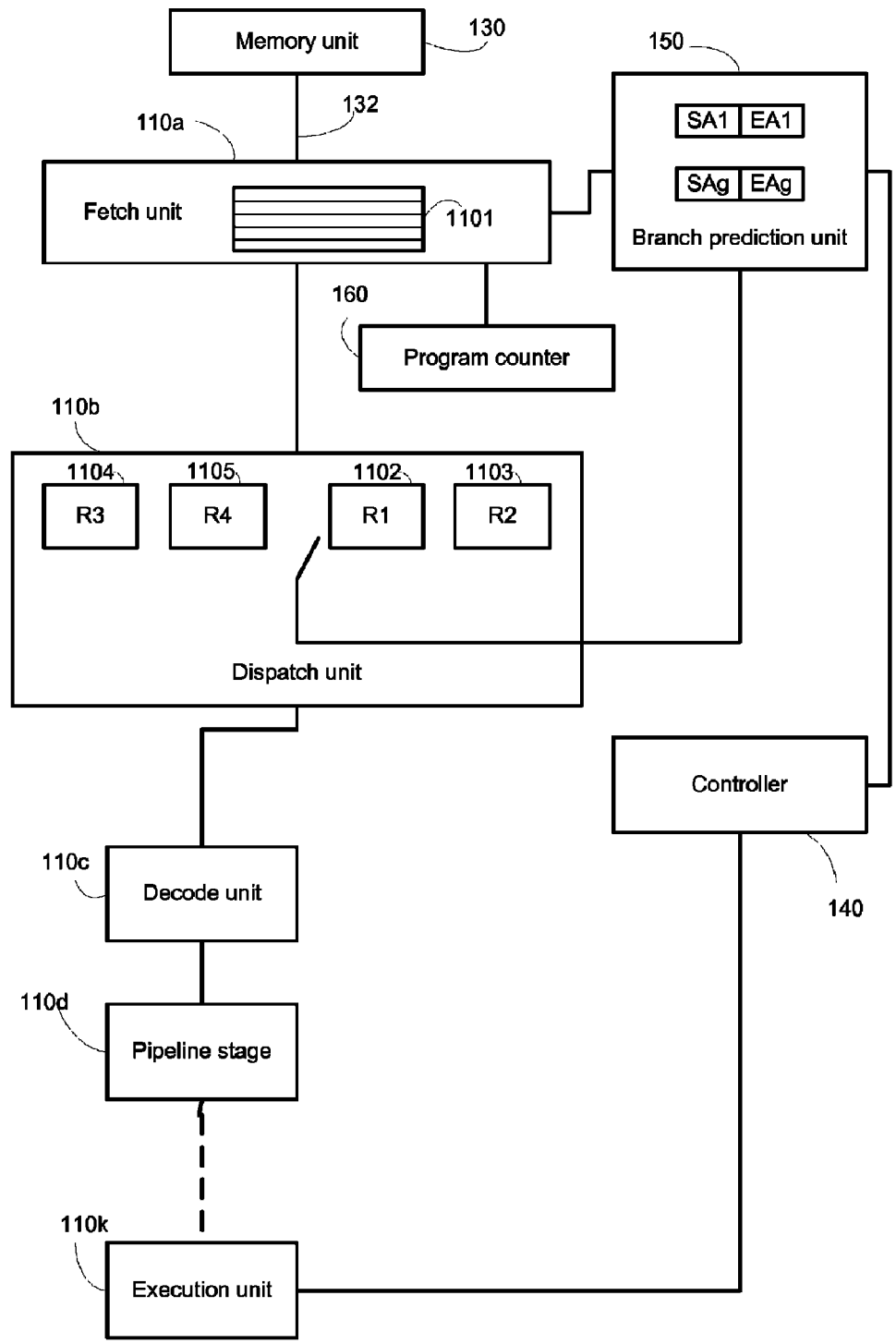
FIG. 1 schematically shows an example of an embodiment of a system.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

It has been shown that a long instruction loop can be executed in an efficient manner by storing multiple start instructions of the instruction loop within dedicated buffers of a dispatch unit, retrieving other instructions of the instruction loop by a fetch unit and allowing a branch prediction unit to participate in the fetching and dispatching processes.

A system is provided. It includes a branch prediction unit (BPU) that is configured to: (i) detect an instruction loop (also referred to as a long instruction loop); wherein a size of the instruction loop exceeds a size of a storage space allocated in the fetch unit for storing fetched instructions; (ii) request from the fetch unit to fetch instructions of the instruction loop that follow the first instructions of the instruction loop; and (iii) select, during iterations of the instruction loop, whether to dispatch from the dispatch unit one of the first instructions of the instruction loop or another instruction that is fetched by the fetch unit; wherein the first instructions of the instruction loop are stored at the dispatch unit.

The system can also include a controller that is configured to: (i) determine that an instruction loop is being processed by a pipeline stage of a processor; wherein during the determining the branch prediction unit is not aware that instructions that were fetched by the fetch unit form an instruction loop; (ii) control a storing of the first instructions of the instruction loop within the dispatch unit; (iii) send to the branch prediction unit instruction loop information; and (iv) request from the fetch unit to fetch instructions of the instruction loop that follow the first instructions of the instruction loop.

The controller can be configured to determine that an instruction loop is being processed in response to a retrieval of an instruction loop indicator.

The dispatch unit can store the first instructions of the instruction loop and prevent an erasure of the first instructions from the dispatch unit after a completion of a sequence of iterations of the instruction loop. After a sequence of iterations of the instruction loop ends the first instructions are erased but the loop information can be maintained in the branch prediction unit so that the branch prediction unit will identify the instruction loop.

The dispatch unit can store the first two instructions of the instruction loop and the branch prediction unit can request from the fetch unit to fetch the third instruction of the instruction loop and additional instructions that follow the third instructions of the instruction loop.

The dispatch unit can store the first VLIWs (for example—the first two VLIWs) of the instruction loop and the branch prediction unit requests from the fetch unit to fetch other variable length groups of instructions of the instruction loop. The dispatch unit can also store multiple fixed size fetch sets that may include portions of at least one VLIW.

FIG. 1 schematically shows an example of an embodiment of system 100.

System 100 includes multiple pipeline stages 110a-110k (wherein pipeline stage 110a is a fetch unit), memory unit 130, controller 140, branch prediction unit 150 and program counter 160.

Pipeline stages 110a-110k can belong to multiple types of cores such as digital signal processing cores, general purpose cores and the like. The processing sequence of an instruction involves processing the instruction by each of the pipeline stages—one pipeline stage after the other. At the end of each execution cycle variable length groups of instructions are sent from one pipeline stage to the other.

The pipeline stages can include (in addition to fetch unit 110a), dispatch unit 110b, decode unit 110c, and additional units such as but not limited to data fetch unit, a memory address calculating unit, and execution unit 110k. The number of pipeline stages can vary from one processor to the other, as well as the maximal length of instruction groups that can be concurrently processed by the processor. Typical pipelines include more than eight pipeline stages. A variable length group of instructions is also referred to as very long instruction word.

Fetch unit 110a is adapted to fetch VLIWs from memory unit 130 and more exactly to fetch fixed size fetch sets that are fixed size chunks of information that includes portions of VLIWs. Fetch unit 110a includes an instruction queue 1101 that stores fixed size chunks of VLIWs (for example—128 bit wide chunks). A VLIW can be wider than the fixed size chunks but this is not necessarily so.

Fetch unit 110a can receive from controller 140, from program counter 160 or from branch prediction unit 150 target addresses of VLIWs (or rather fixed size chunks) to be fetched from memory unit 130 via instruction bus 132.

The size of instruction queue 1101 can be smaller than the size of a long instruction loop. If the instruction loop can be completely stored in instruction queue 110 then the mentioned below method is not necessarily implemented.

Dispatch unit 110b includes dedicated registers (such as R1 1102 and R2 1103) for storing the first two VLIWs of an instruction loop. It is noted that the number of VLIWs that are stored in dispatch unit 110b can exceed two and that instructions other than VLIWs can be stored in these dedicated registers.

Controller 140 can be the first component that detects an instruction loop (especially at the first time the instruction loop is being executed). Controller 140 can detect such an instruction loop by retrieving an instruction loop indicator. The instruction loop indicator can be an instruction or another unique sequence of bits and can appear at the end of the instruction loop. Accordingly, at the first time the instruction loop is being fetched the branch prediction unit 150 is not aware that an instruction loop is fetched and it receives instruction loop information (such as instruction loop starts address, instruction loop size, and instruction loop end address) from controller 140. Branch prediction unit 150 can store one or more pairs (for example—g pairs) (SA1, EA1) . . . (SAg, EAg) of instruction loop start address (SA1 . . . SAg) and instruction loop end addresses (EA1 . . . EAg). Once one of these addresses is fetched by fetch unit 110a the branch prediction unit 150 can determine that an instruction loop is being executed. Dispatch unit 110b can store multiple first VLIWs of up to these g instruction loops. Alternatively, dispatch unit stores first VLIWs of only long instruction loops while the g instruction loops are not limited to long instruction loops.

It is noted that during future executions of the instruction loops the branch prediction unit 150 can (based upon previously provided instruction loop information) control the execution of the instruction loop without being assisted by controller 140. While the instruction loop information can be stored in branch prediction unit 150 after the sequence of iterations of the instruction loop ends the first VLIWs can be erased from dispatch unit 110b, but this is not necessarily so.

Controller 140 can also instruct dispatch unit 110b to store (in dedicated registers R1 and R2) the first two VLIWs of the instruction loop.

During next iterations of the instruction loop the branch prediction unit 150 can control the retrieval of the third and other VLIWs of the instruction loop and control the provision (dispatch) of the first two VLIW from dedicated registers R1 1102 and R2 1102 as well as the provision (dispatch) of other VLIWs from other registers (such as R3 1104 and R4 1105) that are fed from instruction queue 1101.

Accordingly, even if the instruction loop is much longer than the size of instruction buffer 1101, branch prediction unit 150 can instruct to fetch the required instructions, while the first VLIWs of the instruction loop are fetched from dedicated buffers of dispatch unit 110b.

Even if a first VLIW of an instruction loop is fetched during two fetch cycles (if it is included in two fixed size chunks of information) then it is stored in a dedicated buffer of dispatch unit and its dispatch attempts from dispatch unit 110b do not penalize the system.

The number of dedicated buffers allocated for storing the start VLIW of an instruction loop can be determined according to various parameters such as the number of instruction loops that should be supported by system 100 (and their first VLIWs should be stored in dispatch unit), the timing penalty associated with fetching from memory unit 130 the first VLIWs of an instruction loop and the like.

During the first iteration of the first sequence of an instruction loop (when the branch prediction unit is not aware of the instruction loop), system 100 performs the following stages:
(i) Fetch unit 110a fetches VLIWs from memory unit 130, and more specifically fetches fixed size chunks that can include at least a portion of one or more VLIWs; the fetched fixed size chunks are stored in instruction queue 1101 that acts as a first in first out (FIFO) queue, although it can apply other policies (including cache policies).

(ii) Dispatch unit 110*b* receives the fixed size chunks and dispatches VLIWs, one after the other, to other pipeline stages such as 110*c*-100*k*;
(iii) Pipeline stages 110*c*-110*k* process the VLIWs in a pipelined manner;
(iv) Controller 140 receives the VLIWs or information representative of the VLIWs and can determine that an instruction loop is being processed by pipeline stages 110*a*-110*k*. It is noted that branch prediction unit 150 can also receive the VLIWs and if it does not recognize the instruction loop then controller 140 can be allowed to detect the instruction loop.
(v) Controller 140 requests the start address and the sequential fetches after this, instructs dispatch unit 110*b* to store the first VLIWs of the instruction loop at dedicates registers R1 1102 and R2 1103.
(vi) Controller 140 sends to branch prediction unit 150 instruction loop information.
(vii) Controller 140 requests from fetch unit 110*a* to fetch VLIWs of the instruction loop that follow the first two VLIWs of the instruction loop. The request can be sent at the end of the instruction loop or prior to that end.

During a next iteration of the first iteration sequence of the instruction loop (after branch prediction unit 150 is aware of the instruction loop), system 100 performs the following stages:
(i) Fetch unit 110*a* fetches VLIWs (that differ from the two VLIWs of the instruction loop) from memory unit 130, and more specifically fetches fixed size chunks that can include at least a portion of one or more of these VLIWs; these fetched fixed size chunks are stored in instruction queue 1101 that acts as a first in first out (FIFO) queue.
(ii) Dispatch unit 110*b* is instructed by branch prediction unit 150 to start an instruction loop by dispatching the two VLIWs that are stored in dedicated buffers R1 and R2 and only then to dispatch VLIWs from fetch unit 110*a*, wherein the VLIWs are dispatched one after the other, to other pipeline stages such as 110*c*-100*k*;
(iii) Pipeline stages 110*c*-110*k* process the VLIWs in a pipelined manner; and
(iv) Controller 140 can determine when the instruction loop iterations should end.

Controller 140 can be configured to determine whether an instruction loop can be entirely stored in fetch unit 110*a* and if so—it does not utilize dispatch unit 110*b* (the dedicated buffers of dispatch unit 110*b*) to store instructions of the instruction loop.

During a first iteration of a second (or more) iteration sequence of the instruction loop the branch prediction unit 150 will be able to recognize the instruction loop—based upon previously stored instruction loop information and will instruct fetch unit 110*a* to fetch the VLIWs of the instruction loop.

During following iterations of the second (or more) iteration sequence of the instruction loop the first VLIWs will be provided by dispatch unit 110*b*.

Figure 2:
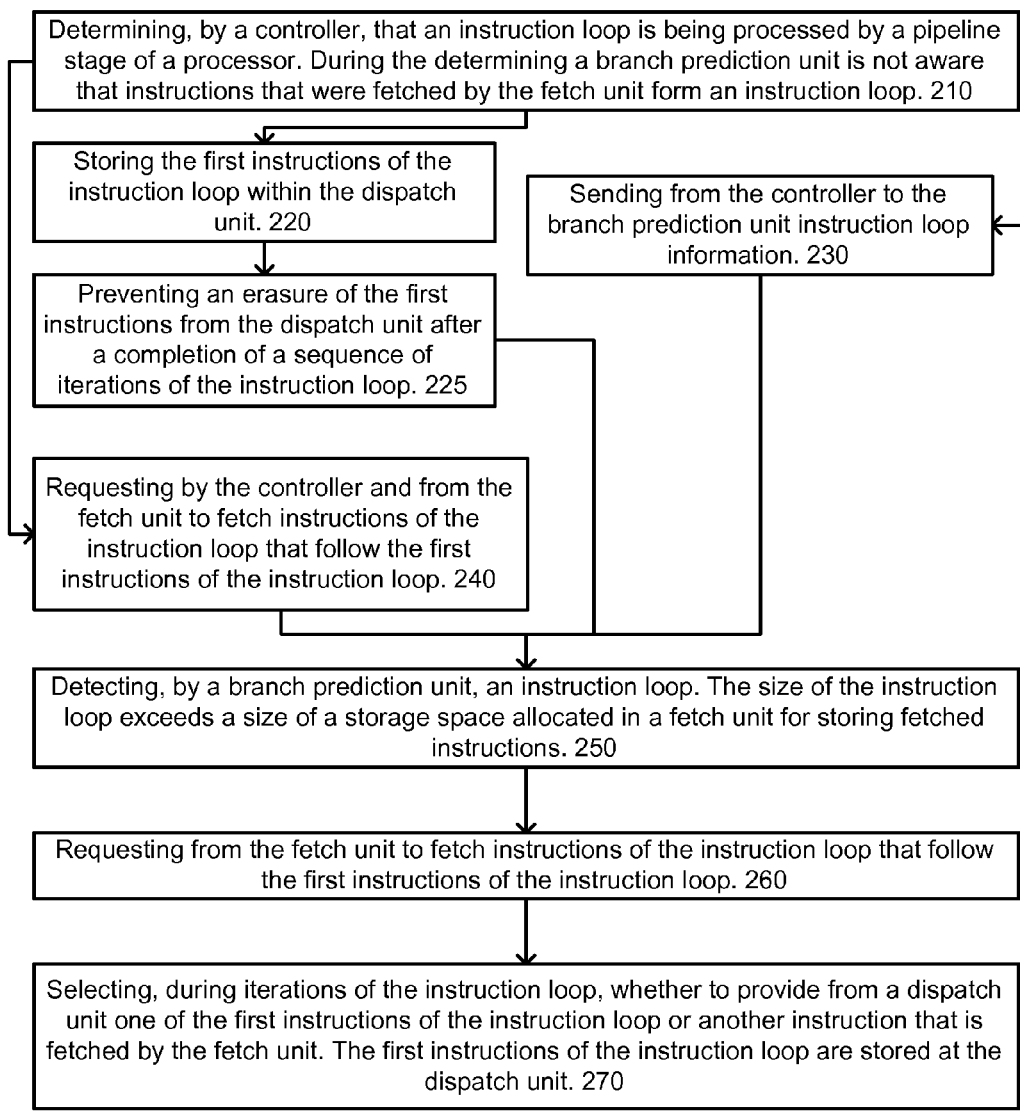
FIG. 2 schematically shows an example of an embodiment of a method.

FIG. 2 schematically shows an example of an embodiment of method 200.

Method 200 for executing an instruction loop starts by stage 210 of determining, by a controller, that an instruction loop is being processed by a pipeline stage of a processor. During the determining a branch prediction unit is not aware that instructions that were fetched by the fetch unit form an instruction loop.

Stage 210 can include determining by the controller that an instruction loop is being processed in response to a retrieval of an instruction loop indicator by the controller. The instruction loop indicator can be located before the instruction loop or at any location within the instruction loop.

Stage 210 can include or be preceded by a stage (not shown) of providing the instructions to the branch prediction unit and determining by the branch prediction unit whether an instruction loop is being fetched and if not performing stage 210. Else, performing stage 310 of FIG. 3.

Stage 210 is followed by stages 220, 230 and 240.

Stage 220 includes storing the first instructions of the instruction loop within the dispatch unit.

Stage 230 includes sending from the controller to the branch prediction unit instruction loop information.

Stage 240 includes requesting by the controller and from the fetch unit to fetch instructions of the instruction loop that follow the first instructions of the instruction loop.

Stages 210, 220, 230 and 240 are executed during a first iteration of the instruction loop. These stages can be referred to as initializing stages.

These initializing stages can be followed by stage 250 of detecting, by a branch prediction unit, an instruction loop. The size of the instruction loop exceeds a size of a storage space allocated in a fetch unit for storing fetched instructions.

Stage 250 is followed by stage 260 of requesting from the fetch unit to fetch instructions of the instruction loop that follow the first instructions of the instruction loop.

Stage 260 is followed by stage 270 of selecting, during iterations of the instruction loop, whether to provide from a dispatch unit one of the first instructions of the instruction loop or another instruction that is fetched by the fetch unit. The first instructions of the instruction loop are stored at the dispatch unit.

Stage 220 can be followed by stage 225 of preventing an erasure of the first instructions from the dispatch unit after a completion of a sequence of iterations of the instruction loop. The first instruction can be erases after a predetermine time has elapsed, if other instruction loops should be supported by the dispatch unit, if a higher priority instruction loop should be supported by the dispatch unit, or in response to other parameters.

Stage 220 can include storing the first two instructions (for example, the first two VLIWs, or the first two fixed size fetch sets from an instruction memory that stores VLIWs) of the instruction loop within the dispatch unit and requesting from the fetch unit to fetch the third instruction of the instruction loop and additional instructions that follow the third instructions of the instruction loop.

Method 200 can also include determining whether an instruction loop can be entirely stored in the fetch unit and if so, does not utilize the dispatch unit to store instructions of the instruction loop.

Figure 3:
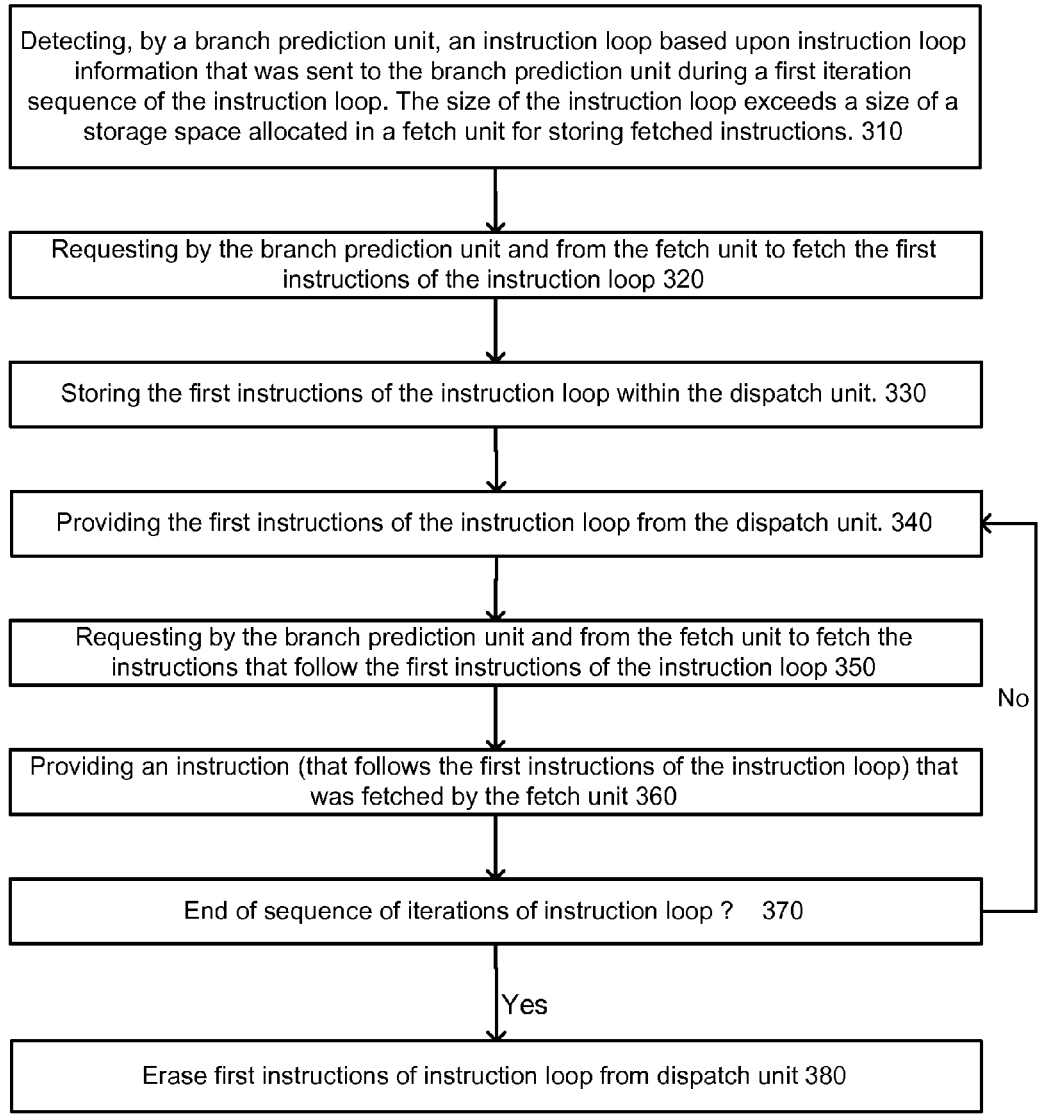
FIG. 3 schematically shows an example of an embodiment of a method.

FIG. 3 schematically shows an example of an embodiment of method 300. Method 300 provides more details relating to an execution of a second (or more) iteration sequence of the instruction loop—after the branch prediction unit 150 is aware of the instruction that start the instruction loop.

Method 300 starts by stage 310 of detecting, by a branch prediction unit, an instruction loop wherein the determination is based upon instruction loop information that was sent to the branch prediction unit during a first iteration sequence of the instruction loop. The size of the instruction loop can exceed the size of a storage space allocated in a fetch unit for storing fetched instructions.

Stage 310 is followed by stage 320 of requesting by the branch prediction unit and from the fetch unit to fetch the first instructions of the instruction loop.

Stage 320 is followed by stage 330 of storing the first instructions of the instruction loop within the dispatch unit.

Stage 330 can be executed in parallel to stage 340 and 350. The requests to retrieve instruction by fetch unit is not necessarily split to two phases, as illustrated by stages 320 and 350.

Stage 330 is followed by stage 340 of providing the first instructions of the instruction loop to a pipeline stage of a processor, from the dispatch unit.

Stage 340 is followed by stage 350 of requesting by the branch prediction unit and from the fetch unit to fetch instructions of the instruction loop that follow the first instructions of the instruction loop.

Stage 350 is followed by stage 360 of providing the next instructions of the instruction loop to a pipeline stage of a processor after being fetched by the fetch unit.

Stage 360 is followed by stage 370 of determining whether the sequence of iterations of the instruction loop ended. If the answer is positive stage 370 is followed by stage 380 of erasing the first instructions from the dispatch unit. If the answer is negative stage 370 is followed by stage 340.

The dispatch unit and the branch prediction unit can have resources for storing the first instructions of the instruction loop and instruction loop information. Either one of these components can apply various memory management techniques for determining when to erase irrelevant information.

Figure 4:
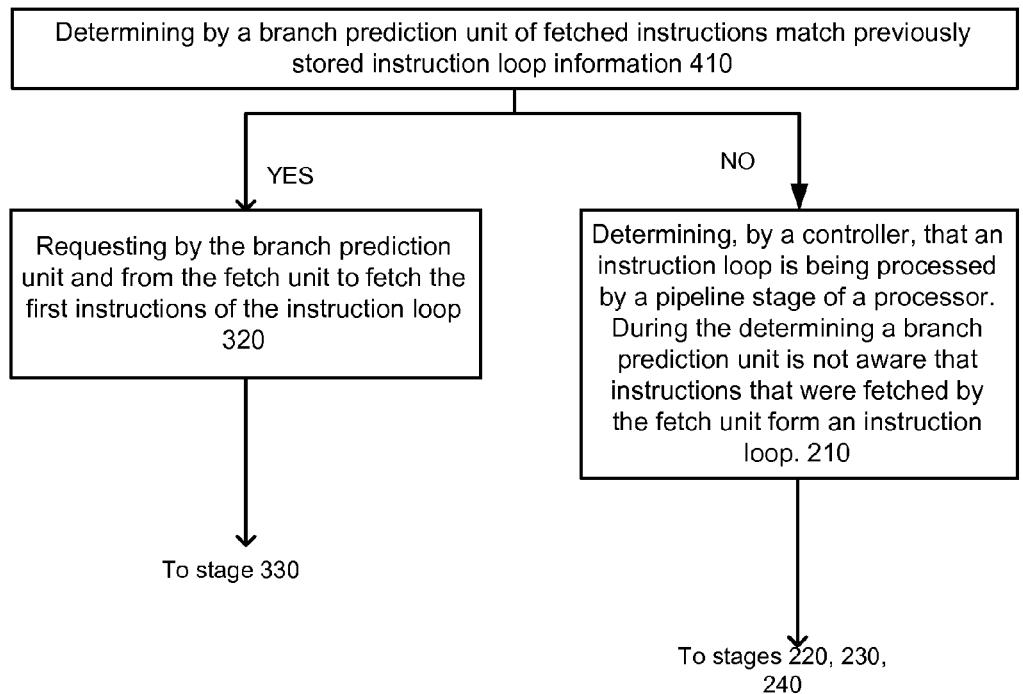
FIG. 4 schematically shows an example of an embodiment of a method.

It is noted that a combination of methods 200 and 300 can be provided. The combined method is illustrated in method 400 of FIG. 4.

Method 400 starts by stage 410 of determining by a branch prediction unit of fetched instructions match previously stored instruction loop information. If the answer is positive stage 410 is followed by stage 320 of method 300 that in turn is followed by other stage of method 300, else—it is followed by stage 210 and other stages of method 200.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for executing an instruction loop, the method comprising:
   in response to detecting, by a branch prediction unit, an instruction loop, wherein a size of the instruction loop exceeds a size of a storage space allocated in a fetch unit for storing fetched instructions:
   storing, during a first iteration of the instruction loop, first instructions of the instruction loop at a dispatch unit;
   maintaining storage of the first instructions at the dispatch unit between the first iteration and a subsequent set of iterations of the instruction loop;
   during the first iteration and the subsequent set of iterations of the instruction loop, requesting from the fetch unit to fetch instructions of the instruction loop that follow the first instructions of the instruction loop;
   selecting, during the subsequent set of iterations of the instruction loop, whether to provide from a dispatch unit one of the first instructions of the instruction loop stored at the dispatch unit or another instruction of the instruction loop that is fetched by the fetch unit; the another instruction not stored at the dispatch unit between the first iteration and the subsequent set of iterations of the instruction loop.

2. The method according to claim 1 wherein the stage of detecting is preceded by:
   determining, by a controller, that an instruction loop is being processed by a pipeline stage of a processor; wherein during the determining the branch prediction unit is not aware that instructions that were fetched by the fetch unit form an instruction loop;
   storing the first instructions of the instruction loop within the dispatch unit;
   sending from the controller to the branch prediction unit instruction loop information;
   requesting by the controller and from the fetch unit to fetch instructions of the instruction loop that follow the first instructions of the instruction loop.

3. The method according to claim 2 comprising determining by the controller that an instruction loop is being processed in response to a retrieval of an instruction loop indicator by the controller.

4. The method according to claim 2 wherein maintaining storage of the first instructions comprises preventing an erasure of the first instructions from the dispatch unit during the loop.

5. The method according to claim 1 wherein storing the first instructions comprises storing the first two instructions of the instruction loop within the dispatch unit and wherein the another instruction of the instruction loop.

6. The method according to claim 1 comprising storing first variable length groups of instructions of the instruction loop within the dispatch unit and requesting from the fetch unit to fetch other variable length groups of instructions of the instruction loop.

7. The method according to claim 1 comprising storing first fixed size fetch sets of the instruction loop within the dispatch unit and requesting from the fetch unit to fetch other variable length groups of instructions of the instruction loop.

8. The method according to claim 1 comprising storing first two fixed size fetch sets of the instruction loop within the dispatch unit and requesting from the fetch unit to fetch other variable length groups of instructions of the instruction loop.

9. A system for executing an instruction loop, the system comprising:
a fetch unit, configured to fetch instructions from a memory unit;
a branch prediction unit that is configured to:
in response to detecting an instruction loop, wherein a size of the instruction loop exceeds a size of a storage space allocated in the fetch unit for storing fetched instructions:
store, during a first iteration of the instruction loop, first instructions of the instruction loop at a dispatch unit;
maintain storage of the first instructions at the dispatch unit between the first iteration and a subsequent set of iterations of the instruction loop;
during the first iteration and the subsequent set of iterations of the instruction loop, request from the fetch unit to fetch instructions of the instruction loop that follow the first instructions of the instruction loop; and
select, during iterations of the instruction loop, whether to provide from a dispatch unit one of the first instructions of the instruction loop or another instruction of the instruction loop that is fetched by the fetch unit; wherein the another instruction is not stored at the dispatch unit between the first iteration and the subsequent iterations of the instruction loop.

10. The system according to claim 9 further comprising a controller that is configured to:
determine that an instruction loop is being processed by a pipeline stage of a processor; wherein during the determining the branch prediction unit is not aware that instructions that were fetched by the fetch unit form an instruction loop; storing the first instructions of the instruction loop within the dispatch unit;
send to the branch prediction unit instruction loop information;
request from the fetch unit to fetch instructions of the instruction loop that follow the first instructions of the instruction loop.

11. The system according to claim 9 wherein the controller is configured to determine that an instruction loop is being processed in response to a retrieval of an instruction loop indicator.

12. The system according to claim 9 wherein the dispatch unit erases the first instructions of the instruction loop after a completion of an iteration sequence of the instruction loop while the branch prediction unit stores the instruction loop information after the completion of the iteration sequence of the instruction loop.

13. The system according to claim 9 wherein the dispatch unit stores the first two instructions of the instruction loop and the branch prediction unit requests from the fetch unit to fetch the third instruction of the instruction loop and additional instructions that follow the third instructions of the instruction loop.

14. The system according to claim 9 wherein the dispatch unit stores first variable length groups of instructions of the instruction loop and the branch prediction unit requests from the fetch unit to fetch other variable length groups of instructions of the instruction loop.

15. The system according to claim 9 wherein the dispatch unit stores first two variable length groups of instructions of the instruction loop and the branch prediction unit requests from the fetch unit to fetch other variable length groups of instructions of the instruction loop.

16. The system according to claim 9 wherein the dispatch unit stores first fixed size fetch sets of the instruction loop and the branch prediction unit requests from the fetch unit to fetch other variable length groups of instructions of the instruction loop.

17. The system according to claim 9 wherein the dispatch unit stores first two fixed size fetch sets of instructions of the instruction loop and the branch prediction unit requests from the fetch unit to fetch other variable length groups of instructions of the instruction loop.

18. The system according to claim 9, further comprising a processor core, the processor core comprising the fetch unit.

19. The system according to claim 18, wherein the processor core comprises a digital signal processor core.

20. The system according to claim 9, further comprising a plurality of processor cores, the plurality of processor cores including the fetch unit.

* * * * *